US012809146B2

(12) United States Patent
Xu et al.

(10) Patent No.: US 12,809,146 B2
(45) Date of Patent: Nov. 24, 2026

(54) COMPACT PHASE AND DARKFIELD LABORATORY X-RAY IMAGING SYSTEM AND METHOD

(71) Applicant: Carl Zeiss X-Ray Microscopy, Inc., Dublin, CA (US)

(72) Inventors: Shiqi Xu, Dublin, CA (US); Matthew Andrew, Livermore, CA (US); Gerhard Krampert, Pleasanton, CA (US); Zhenyang Chen, Dublin, CA (US)

(73) Assignee: Carl Zeiss X-Ray Microscopy, Inc., Dublin, CA (US)

( * ) Notice: Subject to any disclaimer, the term of this patent is extended or adjusted under 35 U.S.C. 154(b) by 98 days.

(21) Appl. No.: 19/000,476

(22) Filed: Dec. 23, 2024

(65) Prior Publication Data

US 2026/0177796 A1 Jun. 25, 2026

(51) Int. Cl.

| | |
|---|---|
| ***G02B 21/00*** | (2006.01) |
| ***G01N 21/41*** | (2006.01) |
| ***G01N 21/63*** | (2006.01) |
| ***G01T 1/20*** | (2006.01) |
| ***G02B 21/14*** | (2006.01) |
| ***G02B 21/36*** | (2006.01) |

(52) U.S. Cl.

CPC ......... *G02B 21/0004* (2013.01); *G01N 21/41* (2013.01); *G01N 21/63* (2013.01); *G02B 21/14* (2013.01); *G02B 21/361* (2013.01); *G01T 1/2002* (2013.01)

(58) Field of Classification Search

CPC ...... G01N 21/41; G01N 21/63; G01T 1/2002; G01B 21/0004; G01B 21/14; G01B 21/361

See application file for complete search history.

(56) References Cited

U.S. PATENT DOCUMENTS

| | | | | |
|---|---|---|---|---|
| 12,130,392 B2 | 10/2024 | Xu et al. | | |
| 2021/0244374 A1 | 8/2021 | Zhao | | |
| 2022/0265231 A1 * | 8/2022 | Shi | .......................... | A61B 6/40 |

OTHER PUBLICATIONS

Bech M., et al., "Quantitative x-ray dark-field computed tomography", Phys. Med. Biol. 55: 5529-5539 (2010).

(Continued)

*Primary Examiner* — Mark R Gaworecki

(74) *Attorney, Agent, or Firm* — HoustonHogle LLP

(57) ABSTRACT

An X-ray microscopy system and method for phase contrast and dark-field imaging utilize a partially coherent X-ray beam generated by a micro-focused X-ray source with a small focal spot size. A spatial beam modulator such as a random phase object, e.g., silicon carbide sandpaper, is placed between the source and the sample to create a random granular speckle pattern. The system employs a high-resolution detection setup with a thin scintillator and a spatially resolved detector with small pixel size to capture shifts in the speckle pattern caused by the sample's refraction effects. By analyzing these shifts, the system computes phase gradients and integrates them to produce detailed phase images, enhancing contrast in low-atomic-number materials like soft tissues and polymers. The compact design reduces source-to-detector distance, improving flux efficiency and system throughput while enabling high-resolution, three-dimensional tomographic imaging.

16 Claims, 8 Drawing Sheets

(56) References Cited

OTHER PUBLICATIONS

Born M., et al., “Principles of optics: electromagnetic theory of propagation, interference and diffraction of light”, Cambridge University Press, 1-952 (1999).
Doherty, A., et al., “Edge-Illumination X-Ray Dark-Field Tomography.” American Physical Society, 19: 054042-1-054042-8 (2023).
Endrizzi, M., “X-ray phase-contrast imaging.” Nuclear instruments and methods in physics research section A: Accelerators, spectrometers, detectors and associated equipment, 878: 88-98 (2018).
Frankot, R.T., et al., “A method for enforcing integrability in shape from shading algorithms.”, IEEE Transactions on pattern analysis and machine intelligence, 10(4): 439-451 (1988).
Goodman, J.W., “Speckle phenomena in optics—Theory and Applications”, 1-451 (2020).
Hagen, C.K., et al., “Low-dose phase contrast tomography with conventional x-ray sources.”, Medical Physics Letter, 41(7): 070701-1-070701-5 (2014).
Horn, B. K.P., et al., “The variational approach to shape from shading.” Computer Vision, Graphics, and Image Processing 33(2): 174-208 (1986).
Momose, A., “X-ray phase imaging reaching clinical uses.” Physica Medica, 79: 93-102 (2020).
Olivo, A., et al., “A coded-aperture technique allowing x-ray phase contrast imaging with conventional sources.” Applied Physics Letters, 91(7): 074106-1-074106-3 (2007).
Pfeiffer, F., et al. “Phase retrieval and differential phase-contrast imaging with low-brilliance X-ray sources.” Nature physics, 2(4): 258-261 (2006).
Pfeiffer, F., et al. “Hard-X-ray dark-field imaging using a grating interferometer.” Nature materials 7(2): 134-137 (2008).
Quéau, Yvain, Jean-Denis Durou, and Jean-François Aujol. “Normal integration: a survey.” Journal of Mathematical Imaging and Vision, 60(4): 576-593 (2018).
Romano, L., et al., “Microfabrication of X-ray Optics by Metal Assisted Chemical Etching: A Review.”, Micromachines, 11(589): 1-23 (2020).
Smith, R., et al. “X-ray directional dark-field imaging using Unified Modulated Pattern Analysis.” Plos one, 17(8): 1-12 (2022).
Zanette, I., et al. “Speckle-based x-ray phase-contrast and dark-field imaging with a laboratory source.” Physical review letters 112(25): 253903 (2014).
Zdora, M.-C., et al., “X-ray phase-contrast imaging and metrology through unified modulated pattern analysis.” Physical review letters, 118.20: 203903 (2017).
Zdora, M.-C., “X-ray Phase-Contrast Imaging Using Near-Field Speckles.” Zdora thesis, Doctoral Thesis accepted by University College London, London, United Kingdom, chapter 9.2, 259-273 (2020).
Zdora, M.-C., “State of the art of X-ray speckle-based phase-contrast and dark-field imaging.” Journal of Imaging, 4(60): 1-36 (2018).
Zdora, M.-C., et al., “X-ray phase tomography with near-field speckles for three-dimensional virtual histology.”, Optica 7(9): 1221-1227 (2020).
Extended European Search Report, mailed on Apr. 29, 2026, from European Application No. 25226615.0, filed on Dec. 22, 2025. 9 pages.
Pavlov, K. M., et al., “Directional dark-field implicit x-ray speckle tracking using an anisotropic-diffusion Fokker-Planck equation”, Arxiv.org, Cornell University Library, 1-11 (2021).
Thuering, T., et al., “Compact x-ray grating interferometry for phase and dark-field computed tomography in the diagnostic energy range”, Phd Dissertation No. 21321, 1-170 (2013).
Vittoria, F. A., et al., “X-ray absorption, phase and dark-field tomography through a beam tracking approach”, Scientific Reports, 5(1): 1-5 (2015).
Yang, F., et al., “X-ray dark-field contrast imaging of water transport during hydration and drying of early-age cement-based materials”, 142(20): 563-565 (2018).

* cited by examiner

COMPACT PHASE AND DARKFIELD LABORATORY X-RAY IMAGING SYSTEM AND METHOD

BACKGROUND OF THE INVENTION

X-ray microscopy leverages the differential absorption of X-rays by materials to generate highly detailed images with micro to nanoscale resolution. When X-rays pass through a sample, their absorption varies based on the atomic composition, density, and thickness of the microscopic structures. This differential absorption is primarily influenced by mechanisms such as the photoelectric effect and Compton scattering. The photoelectric effect plays a crucial role in generating contrast because materials with higher atomic numbers, such as metal inclusions or mineral phases, will attenuate X-rays more than materials or compositions with lower atomic numbers, like organic materials or polymers. As X-rays penetrate the sample, some are absorbed while others pass through, leading to a variation in the X-ray intensity that is ultimately detected by specialized detectors.

The X-ray beam intensity that emerges after traversing the sample is detected and converted into an image, providing information about the internal composition with contrast that reveals fine structural details. The attenuation differences are typically visualized as variations in grayscale in the negative X-ray images: denser areas with high absorption appear lighter, while regions of low density or less absorption appear darker. X-ray microscopes can achieve a remarkable level of spatial resolution, using either synchrotron radiation or laboratory X-ray sources, providing insights into materials science, biological structures, and other applications requiring non-destructive, three-dimensional analysis. By adjusting illumination settings including beam energy, X-ray microscopy can optimize the contrast and resolution for a wide range of materials.

Soft tissue and most organic materials, such as polymers, are usually composed of elements with low atomic numbers. These elements exhibit low attenuation in the X-ray spectrum, which results in conventional absorption-based X-ray images showing very low to no contrast when imaging such materials using differential absorption. However, materials made of low-atomic-number elements generally exhibit a higher refractive index change, which bends and scatters X-rays, making them suitable candidates for imaging with phase contrast mechanisms (Endrizzi, Marco. "X-ray phase-contrast imaging." Nuclear instruments and methods in physics research section A: Accelerators, spectrometers, detectors and associated equipment 878 (2018): 88-98. (Endrizzi 2018); Momose, Atsushi. "X-ray phase imaging reaching clinical uses." Physica Medica 79 (2020): 93-102. (Momose 2020)). To describe the physics of these phenomena and underlying mechanisms, the complex refractive index is often used (Endrizzi 2018, Momose 2020), where the imaginary part models the absorption or attenuation of the X-rays, while the spatial change of the real part describes refraction and scattering. Since X-rays are electromagnetic waves, the measurement is typically performed through the retrieval of the phase signal $\Phi$, which can be defined as:

$$\Phi = \frac{2\pi}{\lambda}\int \delta(z)dz \qquad \text{eq. 1}$$

where is $\lambda$ is the wavelength of the X-ray, and z is the path the X-ray travels. This phase contrast mechanism enables imaging of low-attenuation, low-atomic-number materials with significantly enhanced detail compared to traditional absorption methods, making it particularly powerful for studying soft tissues, polymers, and other organic samples at high resolution.

Due to significant interest in detecting phase (refraction) and dark-field (ultra-small-angle-X-ray-scattering) signals, there is a rich amount of literature on these topics (Endrizzi 2018, Momose 2020). These methods typically attempt to create a visible pattern in the detector plane using gratings or masks, and record this pattern (object absent) as a reference. The sample or object of interest is then presented inside the field of view (FOV), and the phase and dark-field signals can be computationally extracted by analyzing the distortion of the reference pattern. Such methods can be generally categorized into two classes: those using structured patterns (Pfeiffer, Franz, et al. "Phase retrieval and differential phase-contrast imaging with low-brilliance X-ray sources." Nature physics 2.4 (2006): 258-261 (Pfeiffer 2006), Olivo, Alessandro, and Robert Speller. "A coded-aperture technique allowing X-ray phase contrast imaging with conventional sources." Applied Physics Letters 91.7 (2007): 074106-1-074106-3 (Olivo 2007)) and those using unstructured patterns (Zanette, I., et al. "Speckle-based X-ray phase-contrast and dark-field imaging with a laboratory source." Physical review letters 112.25 (2014): 253903 (Zanette 2014)). While all methods originated from synchrotron facilities, which provide high-brilliance, high-coherence sources, they have also been translated into laboratory systems using partially coherent sources (Endrizzi 2018, Zdora2018).

At present, the first category (structured pattern) is more widely implemented in laboratories for two reasons: more relaxed requirements of source coherence (though at the cost of flux dose), and a relatively simpler phase-retrieval algorithm that involves straightforward curve fitting. However, the manufacturing of structured patterns requires advanced fabrication processes, typically demanding intricate electroplating as well as painstaking lithography, which increases system costs. On the other hand, creating an unstructured pattern is significantly easier and cheaper, and can be done using a piece of silicon carbide (SiC) sandpaper, for example. The phase retrieval in these systems is achieved by tracking the random granular pattern with computer vision algorithms (Zdora, Marie-Christine. "State of the art of X-ray speckle-based phase-contrast and dark-field imaging." Journal of Imaging 4.5 (2018): 1-36 (Zdora 2018)). While the hardware add-on is simple and low-cost, the creation of a high-contrast granular speckle pattern poses a higher spatial coherence requirement, and to record and track those granular patterns demands higher resolution detectors.

To achieve sufficient spatial coherence with a large source spot size (e.g., >50 micrometers (μm)), the sample must be placed meters away from the source, as dictated by the van Cittert-Zernike theorem (Born, Max, and Emil Wolf. Principles of optics: electromagnetic theory of propagation, interference and diffraction of light. Cambridge University Press, (1999) 1-952 (Born & Wolf 1999)). Higher source spatial coherence can be achieved by locating the source away from the sample, making the source spot effectively smaller at the sample plane. Additionally, most historical implementations have used flat-panel type detectors with large pixel sizes at the imaging planes. To detect the small refraction angle change while sufficiently sampling the granular pattern, it is necessary to position the detector meters away from the sample. Therefore, most implementations of such methods using laboratory systems end up requiring multi-meter source-to-detector distances, which is both inefficient (resulting in loss of X-ray flux and therefore reduced throughput) and results in bulky systems.

SUMMARY OF THE INVENTION

The present invention provides an X-ray microscopy system and method for phase contrast and dark-field imaging that offer enhanced imaging capabilities in a compact design. The system comprises a laboratory X-ray source configured to emit an at least partially coherent X-ray beam. The X-ray source has a focal spot size of less than 5 micrometers, and preferably less than 3 micrometers, to ensure adequate spatial coherence for speckle pattern generation and detection. The X-ray source is further configured to generate X-rays with energies less than 50 keV, and preferably less than 20 keV, to enhance phase contrast for low-atomic-number materials.

A spatial beam modulator is positioned in the path of the X-ray beam to generate a speckle pattern in the field of view (FOV). The spatial beam modulator can be a random phase object, such as a piece of silicon carbide (SiC) sandpaper, or structured phase object, such as a grating. The spatial beam modulator introduces (e.g. random) granular speckle patterns into the X-ray beam, which are essential for detecting phase shifts and dark-field signals caused by the sample.

A sample stage is configured to hold and position a sample within the X-ray beam, either before or after the spatial beam modulator. This flexibility allows for optimal placement depending on the specific imaging requirements. The sample stage may also be configured to rotate and translate the sample to enable tomographic imaging.

An X-ray detection system is positioned to receive the X-ray beam after it has been modulated by both the spatial beam modulator and the sample.

The X-ray detection system comprises a spatially resolved detector has a pixel size sufficient to capture shifts in the speckle pattern caused by refraction of the X-rays as they pass through the spatial beam modulator and the sample. Specifically, the detector has an effective pixel size less than 5 micrometers, and preferably less than 300 nanometers, to ensure adequate resolution for detecting speckle pattern shifts.

In the current embodiment, the detection system further comprises a thin scintillator configured to convert X-rays into light, providing high resolution for low-energy X-rays and an optical system, including an objective lens and a tube lens, that is configured to collect and focus the light from the scintillator onto the spatially resolved detector.

In other embodiments the X-ray detection system comprises direct conversion spatially resolved X-ray detectors.

The system is configured such that the source-to-detector distance is less than 100 centimeters and even less than 60 centimeters. This compact configuration reduces X-ray flux loss, improves system throughput, and enables high-resolution imaging without the need for large, bulky equipment.

The invention also provides a method for simultaneous X-ray phase contrast and dark-field imaging of a sample. The method comprises generating an at least partially coherent X-ray beam using a laboratory X-ray source with a focal spot size of less than 5 micrometers, passing the X-ray beam through a spatial beam modulator, such as a random phase object or a grating, to generate a speckle pattern in the field of view, positioning a sample in the beam, either before or after the spatial beam modulator, detecting the X-ray beam after it has passed through the sample using an X-ray detection system comprising a spatially resolved detector with a pixel size sufficient to capture shifts and contrast degradation in the speckle pattern, obtaining a reference speckle image without the sample and a sample speckle image with the sample in the field of view, registering the reference and sample speckle images to align the speckle patterns accurately, tracking shifts in the speckle patterns between the reference and sample images to determine phase gradients, using correlation-based methods or distance-based methods, integrating the phase gradients to produce a phase image of the sample and analyzing contrast changes in the speckle patterns to determine a dark-field signal. Integration may involve using Fourier methods or variational methods to compute the integrated phase, repeating the steps of obtaining speckle images while rotating and/or translating the sample to collect data from multiple angles, and reconstructing a three-dimensional tomographic image of the sample using the collected data.

The method ensures that the source-to-detector distance remains less than 100 centimeters, to maintain system compactness and efficiency, and can even be less than 60 centimeters.

By analyzing the shifts and contrast changes in the speckle patterns, the system computes phase gradients and dark-field signals, producing detailed phase images that enhance contrast in low-atomic-number materials like soft tissues and polymers. This makes the system particularly powerful for studying such samples at high resolution, providing insights into materials science, biological structures, and other applications requiring non-destructive, three-dimensional analysis.

The compact design of the system reduces source-to-detector distance, improving flux efficiency and system throughput while enabling high-resolution, three-dimensional tomographic imaging. The use of a laboratory X-ray source with a small focal spot size and low-energy X-rays enhances the spatial coherence of the beam, which is critical for generating high-contrast speckle patterns and detecting small refraction and scattering signals from the sample.

In summary, the present invention offers an X-ray microscopy system and method that provide simultaneous phase contrast and dark-field imaging in a compact configuration. The system's components and the method's steps are designed to work synergistically to achieve high-resolution imaging with improved contrast for low-attenuation, low-atomic-number materials, all while maintaining efficiency and reducing the overall size of the equipment required.

In embodiments, the X-ray source is a laboratory X-ray source with a focal spot size of less than 5 micrometers (μm), and can be less than 3 micrometers to ensure spatial coherence.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Also, all conjunctions used are to be understood in the most inclusive sense possible. Thus, the word "or" should be understood as having the definition of a logical "or" rather than that of a logical "exclusive or" unless the context clearly necessitates otherwise. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
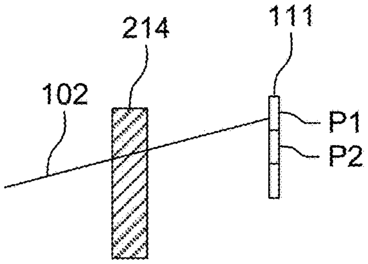
FIGS. 1A, 1B, and 1C are schematic diagrams illustrating the contrast mechanisms for absorption, phase, and ultra-small angle X-ray scattering.
Figure 1B:
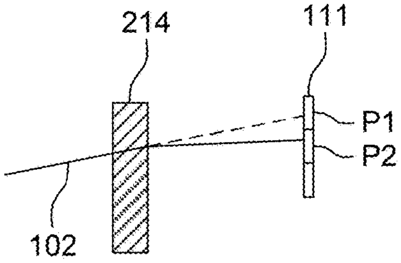
Figure 1C:
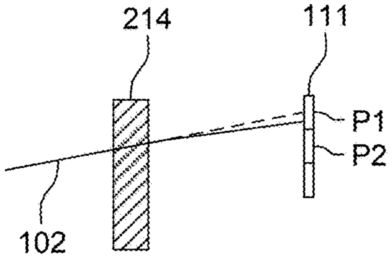

FIGS. 1A, 1B, and 1C respectively illustrate three X-ray-matter interaction phenomena: absorption, phase, and ultra-small angle X-ray scattering.

FIG. 1A illustrates the absorption phenomena. While the travel direction stays the same, the intensity of the X-rays 102 is reduced by the sample 214 (attenuation). FIG. 1B shows the refraction phenomena. Due to a phase change in the sample 214 (i.e. due to different refractive indexes), the X-ray 102 is bent by the sample phase and can be detected by a pixelated, spatially resolved array detector (such as a camera sensor) 111. This usually results in shifts of features in the captured image. As illustrated, the X-rays are bent enough such that they fall on an adjacent or adjoining pixel (P1, P2) of the camera 111, whilst the attenuation part is imaged at P1. FIG. 1C, on the other hand, describes how ultra-small angle X-ray scattering (USAXS) (also known as the dark-field signal (Pfeiffer, Franz, et al. "Hard-X-ray dark-field imaging using a grating interferometer." Nature materials 7.2 (2008): 134-137 (Pfeiffer 2008)) works. USAXS are scattering events caused by sub-resolution features that bend the X-ray in a series of small angles that sum together to degrade the contrast of images, and can be extracted by analyzing the "blurring" of the feature. As illustrated, the X-rays are only bent slightly such that they fall on the same pixel P1 of the detector 111.

Figure 2:
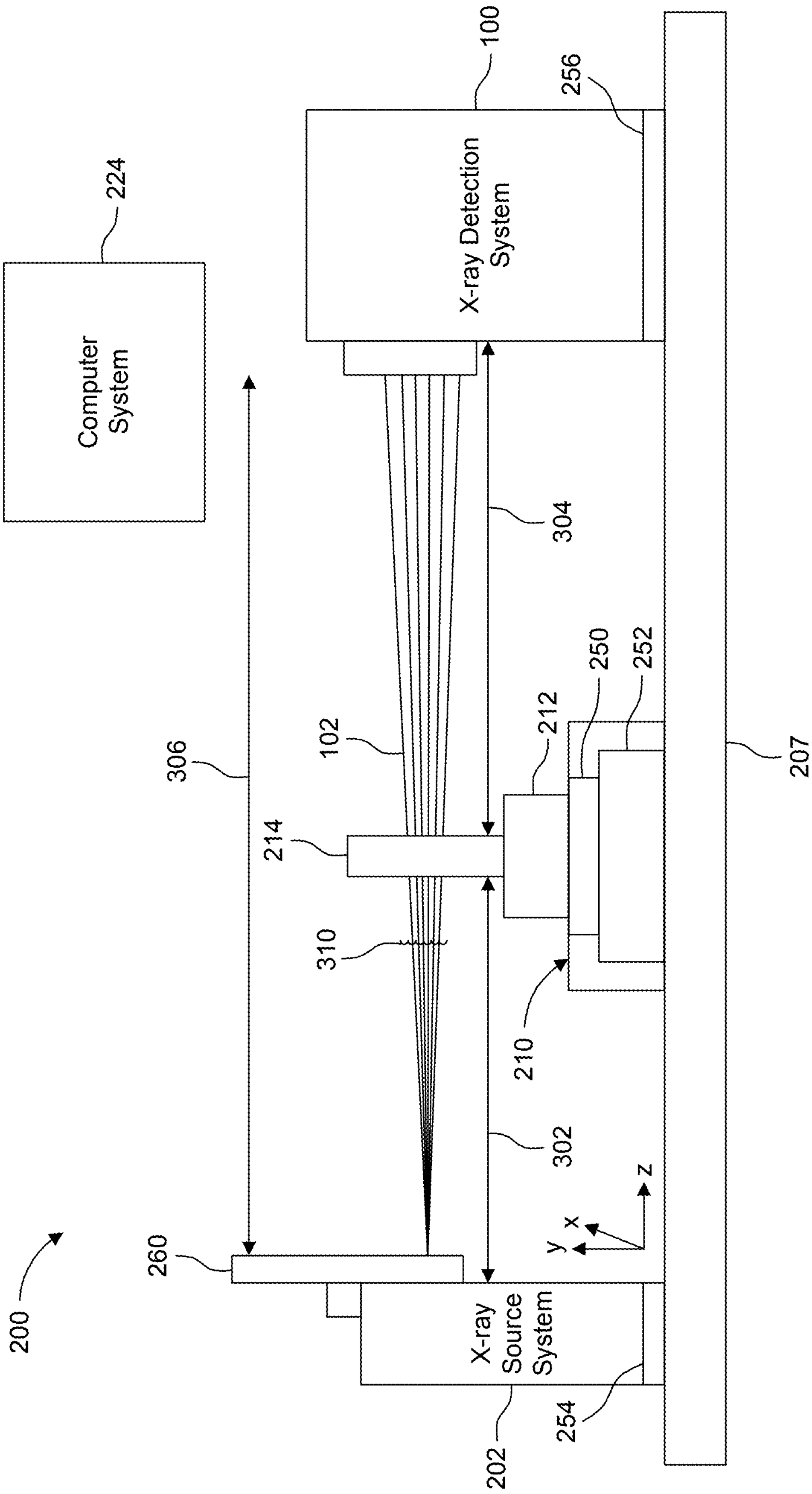
FIG. 2 is a schematic diagram of an X-ray microscope to which the present invention is applicable.

FIG. 2 is a schematic diagram of an X-ray CT microscopy system 200 to which the present invention is applicable.

The X-ray microscopy system 200 generally includes an X-ray imaging system that has an X-ray source system 202 that generates an at least partially coherent X-ray beam 102 and a sample stage system 210 with sample holder 212 for holding an object or sample 214 and positioning it to enable scanning of the sample 214 in the stationary X-ray beam 102. An XX-ray detection system 100 detects the X-ray beam 102 after it has been modulated by the sample 214. A base such as a platform or optics table 207 provides a stable foundation for the microscope 200.

In general, the sample stage system 210 has the ability to position and rotate the sample 214 in the beam 102. Thus, the sample stage system 210 will typically include a precision 3-axis stage 250 that translates and positions the sample along the x, y, and z axes, very precisely but over relatively small ranges of travel. This allows a region of interest of the sample 214 to be located within the beam 102. The 3-stage stage 250 is mounted on a theta stage 252 that rotates the sample 214 in the beam around the y-axis. The theta stage 252 is in turn mounted on the base 107.

The XX-ray beam 102 generated by source 202 is preferably conditioned to suppress unwanted energies or wavelengths of radiation to improve beam coherence. For example, undesired wavelengths present in the beam are eliminated or attenuated, using, for instance, energy filters (designed to select a desired X-ray wavelength range (bandwidth)) held in a filter wheel 260.

When the sample 214 is exposed to the X-ray beam 102, the X-ray photons transmitted through the sample form a modulated X-ray beam that is received by the X-ray detection system 100.

Typically (with a cone beam X-ray), a magnified projection image of the sample 214 is formed on the X-ray detection system 100. The geometrical magnification is equal to the inverse ratio of the source-to-sample distance 302 and the sample-to-detector distance 304.

Typically, the XX-ray source system 202 and the X-ray detection system 100 are mounted on respective z-axis stages. For example, in the illustrated example, the X-ray source system 202 is mounted to the base 207 via a source stage 254, and the X-ray detection system 100 is mounted to the base 207 via a detector stage 256. In practice, the source stage 254 and the detector stage 256 are lower precision, high travel range stages that allow the XX-ray source system 202 and X-ray detection system 100 to be moved into position and also to adjust the source-to-sample (302) and/or sample-to-detector distance (304).

The operation of the X-ray CT microscopy system 200 and the scanning of the sample 214 is often controlled by a computer system 224 to process the images or projections and then perform tomographic reconstruction. As such, the computer system 224 often includes an image processor subsystem, a controller subsystem. The computer system 224, with the possible assistance of its image processor, accepts the set of images from the detection system 100 associated with each rotation angle of the sample 214 to build up the scan. The image processor combines the projection images using a CT reconstruction algorithm to create 3D tomographic volume information for the sample. The reconstruction algorithm may be analytical, where convolution or frequency domain filtering of the projection data is combined with back projection onto a reconstruction grid. Alternatively, it may be iterative, where techniques from numerical linear algebra or optimization theory are used to solve a discretized version of the projection process, which may include modeling of the physical properties of the imaging system.

The present invention employs a combination of components: 1) a sufficiently spatially coherent X-ray source 202, 2) a spatial beam modulator 310 located in the beam between the source 202 and the X-ray detection system 100, and 3) a spatially resolved detector as part of the X-ray detection system 100 (not shown). This spatially resolved detector must have a sufficiently small detector pixel size for capturing the X-ray speckle pattern and specifically shift in this speckle pattern caused by refraction of the X-rays as they pass through the spatial beam modulator 310 and the sample. Specifically, the detector has an effective pixel size less than 5 micrometers, and preferably less than 300 nanometers, to ensure adequate resolution for detecting speckle pattern shifts.

The X-ray source 202 is a micro focused "laboratory X-ray source." As used herein, a "laboratory X-ray source" is any suitable source of X-rays that is not a synchrotron X-ray radiation source. Laboratory X-ray source 202 can be an X-ray tube, in which electrons are accelerated in a vacuum by an electric field and shot into a target piece of metal, with X-rays being emitted as the electrons decelerate in the metal. Typically, such sources produce a continuous spectrum of background X-rays combined with sharp peaks in intensity at certain energies that derive from the characteristic lines of the selected target, depending on the type of metal target used.

In one example, the X-ray source 202 is a micro focused source, with a Tungsten target. Targets that include Molybdenum, Gold, Platinum, Silver or Copper also can be employed. Preferably a transmission-type target configuration is used in which the electron beam strikes the thin target from its backside. The X-rays emitted from the other side of the target are used as the beam 102. That said, reflective-type target configurations are used in other embodiments.

To provide adequate coherence, the X-ray source 202 has a focal spot size of about 5 micrometers (μm) or less, and preferably less than 3 μm, such a 2.2 μm, or even smaller. By having a small focal spot, the X-ray source 202 can generate high-brilliance X-rays with good signal-to-noise ratio in a reasonable exposure time.

The selected energy should be relatively low as these energies will exhibit that largest phase signal. As a general rule, the energy should be lower than 50 KeV and preferably lower than 20 KeV.

The coherence of the beam 102 assists the generation of a high contrast random granular speckle pattern in the X-ray detection system 100, but also enhance the sensitivity of detecting small refraction and scattering signal.

The spatial beam modulator 310 can take several different forms. Generally, the spatial beam modulator is a random phase object or grating. Possible gratings include one dimensional, two dimensional and circular gratings.

The random phase object can either be a quasi or pseudo random object or a random object. One example of a preferred random phase object is a piece of silicon carbine (SiC) sandpaper. In addition, other materials instead of SiC sandpaper can be used such as other low atomic number materials such as aluminum and silicon have stronger phase perturbation and less intensity perturbation capability, to contribute to the generation of higher contrast.

Although SiC is near an optimal material for making a phase modulator mask, and thanks to decades of research and process optimization companies such as 3M, depositing SiC to make paper is a very mature technology. Due to presence of semi-monolayer round spherical micro-objects (i.e., grit adhered to paper for form the sandpaper), the aspect ratio (height to width) is not high, resulting in lower contrast modulation patterns. One way of improving pattern contrast is to use coarser grit sandpapers, though at the cost of grain size. Stacking multiple sandpaper together has also been considered, results in higher contrast (e.g., a stack of two pieces of sandpaper is usually 20% higher contrast than single one), though at cost of flux as those abrasive papers are not pure phase objects and have substrates that result in an ~20% flux decrease.

In addition, there are also a few candidates that have been proposed as potentially better phase masks than abrasive/sandpaper, such as using metal-assisted chemical etching (MACE) process and nanowire (Romano L., et al., Microfabrication of X-ray Optics by Metal Assisted Chemical Etching: A Review, Micromachines, 11, 589; (2020): 1-23, doi: 10.3390/mi11060589 (Romano2020)). Indeed, results from MACE pattern have been demonstrated that can generate finer structures and appropriate for X-ray phase imaging (Zdora, Marie-Christine, X-ray Phase-Contrast Imaging Using Near-Field Speckles Zdora thesis, Doctoral Thesis accepted by University College London, London, United Kingdom, Chapter 9.2, doi.org/10.1007/978-3-030-66329-2, (2020): 259-273 (Zdora thesis 2020)). These patterns can be actual random patterns or quasi or pseudo random. Generally, however, MACE patterns produce lower structure contrast, even with coherent radiation in synchrotron facilities. The nanowire option is expected to produce similar results (higher resolution, much lower contrast) (Romano2020).

In any case, in one embodiment, the spatial beam modulator 310 was chosen to be sandpaper (1000 grit) made with SiC onto a lightweighted tube (3d printed with nylon) that is threaded to the filter wheel 260.

In addition, the spatial beam modulator 310 can also be placed after the sample, with no expected variation in performance.

Figure 3:
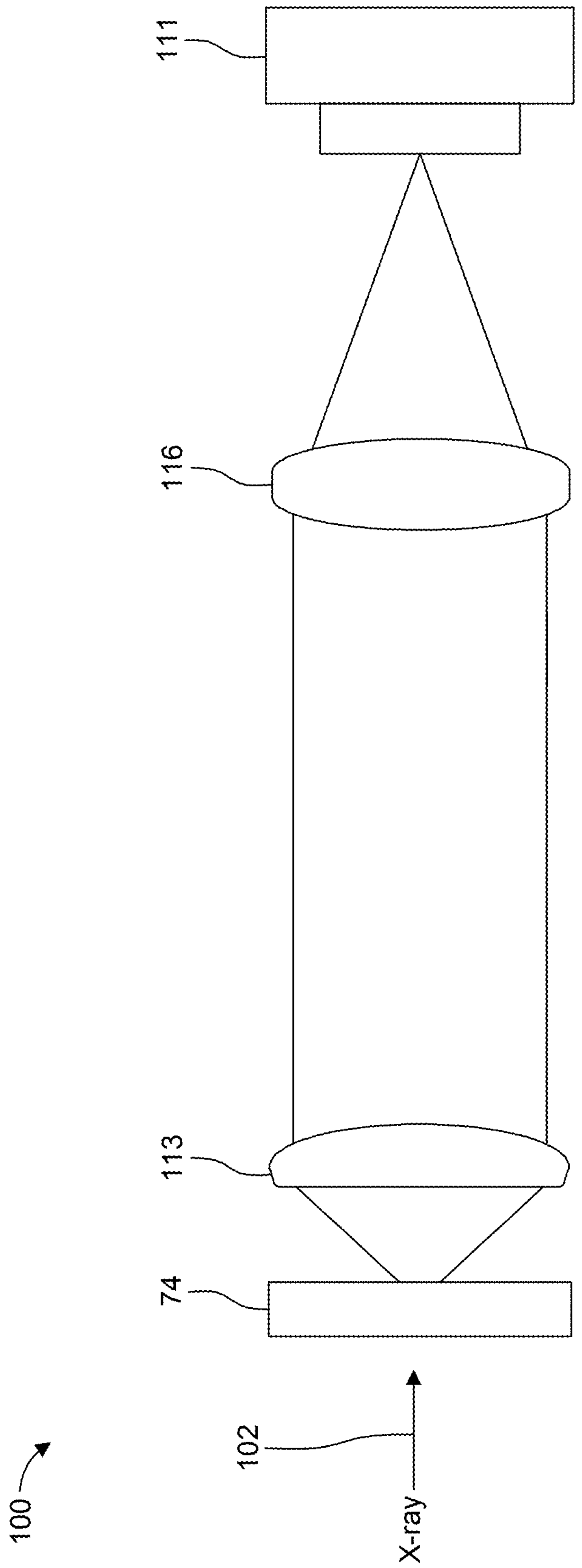
FIG. 3 is schematic diagram of a two stage X-ray detection system used in the microscope according to a preferred embodiment.

FIG. 3 shows one embodiment with a two stage configuration of the detector 100. Here, incoming X-rays 102 are received in a scintillator 74, which converts the X-rays into light, often visible light. The light is collected by an objective lens 113. An image is then formed on a spatially resolved detector 111 (e.g., camera image sensor) by a tube lens 116. This optical stage often provides optical magnification, that is greater than 1× magnification and often greater than 1.5× magnification. Currently, 2× magnification or more is provided such as 4× magnification or more. In addition, the scintillator 74 should be thin ensuring best achievable resolution to the low energy X-rays. The thin scintillator is enough to stop most of the low energy X-rays, and the thin scintillator will give better resolution. For example, for an exemplary 4× objective, the depth of focus is 10 μm. On the other hand, for 20× objective, the depth of focus is smaller. Therefore, in general a scintillator of less than 10 μm generally provides a good tradeoff for may use cases.

The detector 111 preferably is an image sensor having a two dimensional array of at least 1000 by 1000 pixels and preferably has less than 5 μm effective pixel size such as a 3.38 μm effective pixel size or less in each dimension. In some examples, the effective pixel size on the detector 111 is less than 300 nm. This is close to the diffraction limit of the visible light wavelengths produced by the scintillator 74. Effective pixel size refers to the actual pixel size of the detector scaled by the magnification of the optical stage, thus representing the pixel size at the scintillator 74. So, for example, for an optical stage providing 4× magnification, a 5 μm effective pixel size at the scintillator 74 corresponds to a 20 μm actual pixel size on the detector 111.

While the current embodiment employs a two stage detector configuration, other detectors and detector technologies can be used. For example, a direct detector is a possible alternative, providing it has sufficient resolution. For example, U.S. Pat. No. 12,130,392, by Xu and vom Hagen, which is incorporated herein in its entirety, describes a high resolution light valve X-ray detector that could be used, especially when imaging physically large samples.

This setup enables a relatively compact system in which the source-detector distance 306 is less than less than 1 meter (m) (100 centimeter (cm)), such as about 60 cm or less, or even 30 cm, or less. In fact, 24 cm has been demonstrated. Thus, generally, between 15 cm and 60 cm seems optimal.

In the present system, there is a relationship between the source spot size and the pixels size of the detector. According to van Cittert-Zernike Theorem, the spatial coherence area $A_c$ is given by $$A_c = \frac{D^2\lambda^2}{\pi d^2}$$

Where D is the distance away, and d is the spot diameter. This area at the sample plane suggests the area within which waves will coherently interface with each other on-average, and this can be used as a design guidance of the selection of detector resolution (at sample plane) to detect the phase signal with good sensitivity. For a typical 15 cm source to sample distance, with a 2 μm source spot at 20 keV, this gives about 2.5×2.5 μm$^2$ coherence area. Ideally, we want to limit the processing window (when we do the feature matching for detecting shifts) to not be significantly bigger than this area. This coherence area matches well with a two stage detector providing 4× magnification placed at 15 cm away from the sample (1.68 μm resolution at sample plane). With 3 pixels (5.04 μm effective pixel size), the local features (introduced by the spatial beam modulator) are well captured, while still maintaining good sensitivity detecting the shifts. Using higher resolution detector can in principle reduce this coherence limit (i.e., have either larger spot, or place the source closer), if the feature size of spatial beam modulator can be reduced to be as small as the reduced coherence area.

According to the transport of intensity theory, the displacement in direction x is on first order approximately (literally, from the first order Taylor expansion . . . )

$$\delta_x = (z/k)\frac{\partial \phi}{\partial x},$$

Where $$k = \frac{2\pi}{\lambda}$$

is the wavenumber. ϕ is defined in eq1. It is generally desired that this displacement is larger than a fraction of pixel size at the detector plane, such that the phase gradient $$\frac{\partial \phi}{\partial x}$$

can be detected.

Figure 4A:
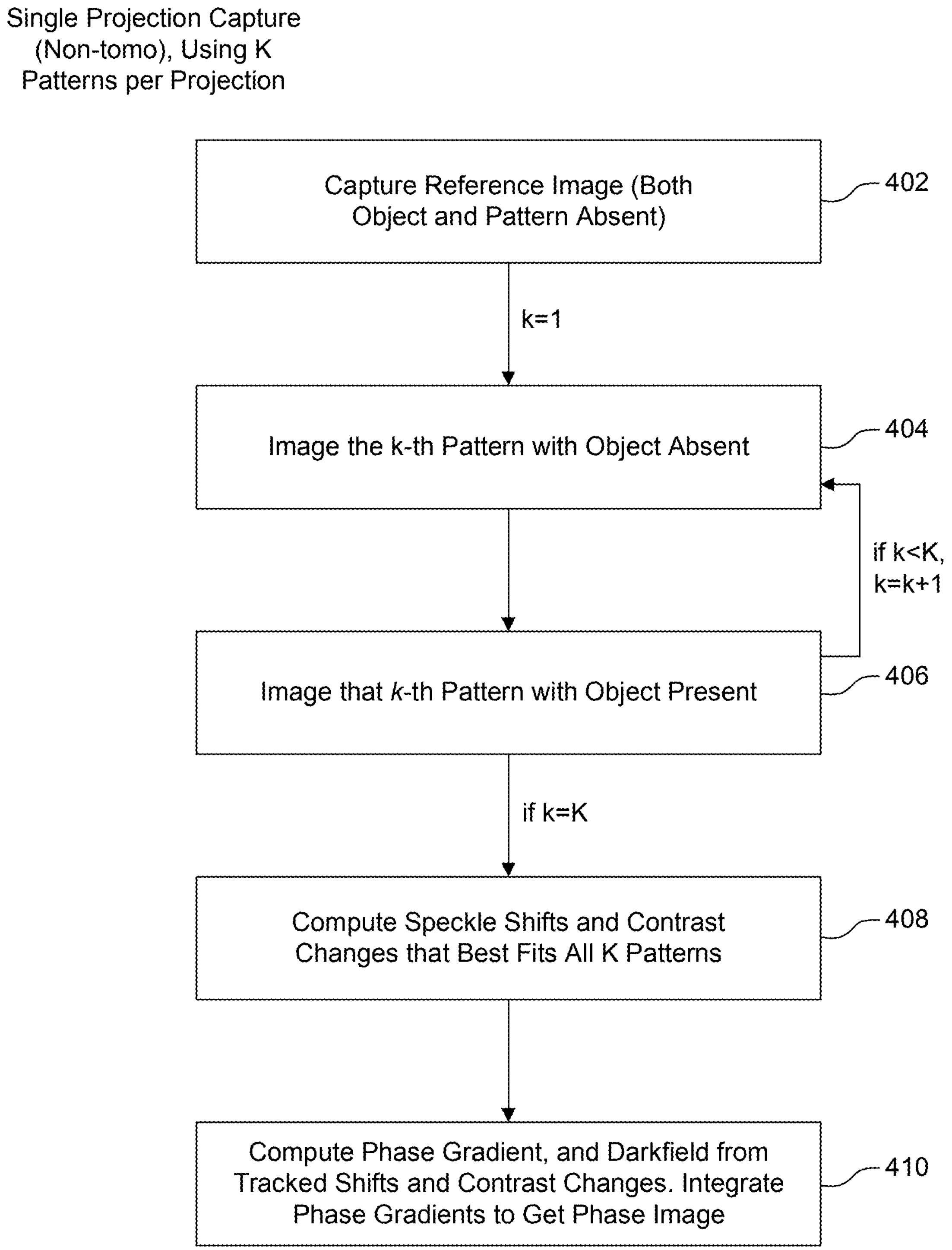
FIGS. 4A and 4B are flow diagrams showing imaging methods according to the invention.

FIG. 4A is a flow diagram illustrating the dark field imaging method according to the present invention. Preferably, this method is executed automatically by the control of the X-ray CT microscopy system 200 by the computer system 224. In general, to ensure the best phase and dark-field retrieval quality, images are taken of multiple patterns, with sample present in the X-ray and absent.

First, in step 402, a reference image is captured with both the object of interest or sample 214 and the spatial beam modulator 310 removed from the X-ray beam 102. The reference images of free space (air) are used to correct potential non-uniformity in the intensity across the field, for all later measurements.

In step 404, the spatial beam modulator 310 is added into the path of the X-ray beam 102 and the speckle pattern is detected by capturing a speckle pattern image.

In step 406, the spatial beam modulator 310 and object of interest or sample 214 are added into the path of the X-ray beam 102 and the speckle pattern is detected (speckle-pattern-with-sample image). This can be done by locking the spatial beam modulator 310 in the beam pathand moving the object in and out of the field of view of the system 200 so that the shifts in the speckle pattern caused by the presence of the sample 214 can be tracked and detected.

This process is repeated K times, where K is the number of patterns, in which each iteration moves to the k+1 pattern. Typically, K is greater than 10 and often greater than 20 or 25. K is currently typically between 50 and 60 and is usually less than 80.

In general, larger values for K yield better resolution, but the performance will plateau eventually. The rule of thumb is choose K such that the average_speckle_size/sqrt(K) is the desired resolution; sqrt( ) comes from the fact that we track the shift in two dimensions.

In step 408, the shifts in the speckle patterns and the contrast changes are computed for all K patterns from the captured images by the computer system 224.

Because the refraction of X-ray caused by the sample 214, the speckle patterns shift. Moreover, because of the combination of the X-ray energy, coherence of the source, and the detector resolution, these shifts are detected thereby providing information on the phase gradient (Zanette2014).

The shifts speckle patterns are in one embodiment computed using fast-Fourier transform methods by the computer system 224. Such methods are widely used for rapid registering large-sized images, the primary goal is here is to register a large number of patches of speckles.

There are a few ways for tracking the shift of speckles from reference images (sample absent) and sample images (sample present) by the computer system 224. The two general ways being distance based (note that distance here refers to mathematical concept, in context of functional space), and correlation based.

The distance-based methods aim to find the shifts, absorption, and darkfield signal that minimize the distance between speckles.

The correlation-based methods, on the other hand, usually compute the similarity of the two patterns with a normalized cross correlation. Therefore, the normalized cross-correlation in the native space domain is implemented. It should leverage the existing highly optimized operations in modern deep learning libraries. Specifically, the average pool operation is preferably used to compute the mean of the shifts of all of the small patches on a large image.

With reference and sample images registered, the shifts in horizontal and vertical directions are proportional to the phase gradient in those directions, respectively.

Then in step 410, the phase gradient and darkfield image (for each pixel) are computed from tracked shifts and contrast changes, respectively, by the computer system 224. Preferably, the phase gradient is integrated by the computer system 224 to produce a final image of the phase. The integration result is highly sensitive to noise, and discontinuity. To compute a proper integrated phase, methods from the normal integral computer vision problem (Quéau, Yvain, Jean-Denis Durou, and Jean-François Aujol. "Normal integration: a survey." Journal of Mathematical Imaging and Vision 60 (4) (2018): 576-593 (Quéau 2018)) are employed in the programming of the computer system 224, in one embodiment.

Figure 4B:
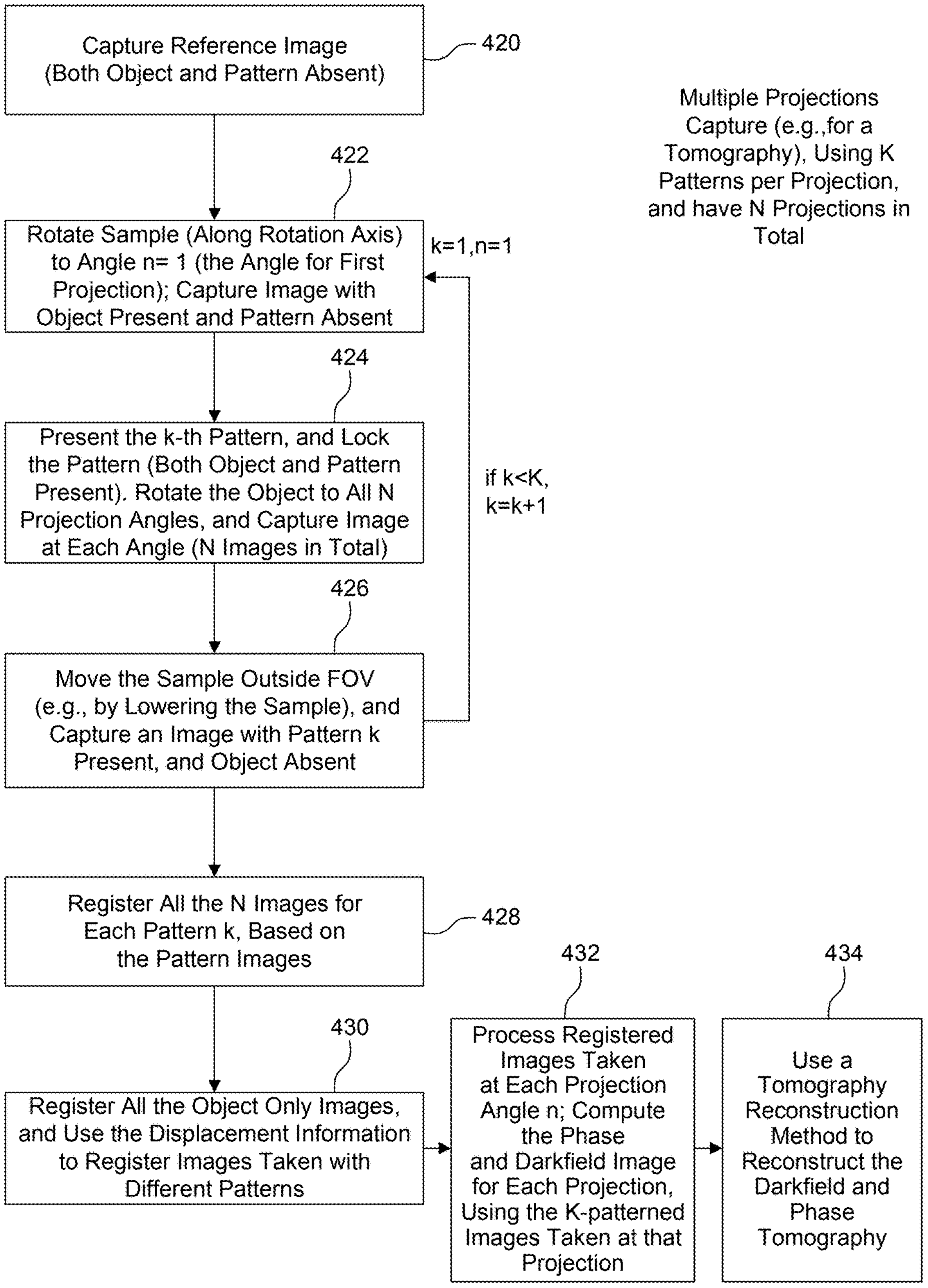

FIG. 4B is a flow diagram illustrating the dark field imaging method according to one aspect of the present invention for tomography. In general, to ensure the best phase and darkfield retrieval quality, images are taken of multiple patterns, with sample present and absent. Preferably, this method is executed automatically by the control of the X-ray CT microscopy system 200 by the computer system 224.

First, in step 402, a reference image is captured with both the object of interest or sample 214 and the spatial beam modulator 310 removed from the X-ray beam 102. The reference images of free space (air) is used to correct potential non-uniform intensity across the field, for all later measurements.

Then in steps 422, 424, and 426, images are taken at n=1, 2, . . . . N different angles.

In summary, for k=1,2,3 . . . , K images for K different patterns are captured with sample absent and K×N images for all patterns with sample present at N different angles are captured. In addition, potential drifts caused by thermal or mechanical instability must be considered. For example, it is also beneficial to capture additional images of sample only (pattern absent). Finally, a sequence of images must be captured in which drifts can be estimated.

In more detail, with the pattern absent (i.e., spatial beam modulator 310 removed from the X-ray beam 102), the sample is moved inside FOV in step 422. At the first projection angle, an image is captured, referred as $\text{prop}^{k=1,\,n=1}$ (propagation phase image).

Then, in step 424, the pattern k=1 is provided by moving the spatial beam modulator 310 into the X-ray beam 102. In addition, the sample is rotated to angles: n=1, 2, . . . . N in sequence, and images $\text{proj}^{k=1,n=1,2,\ldots N}$ are taken (with both pattern k and sample-at-angle-n present).

Then, in step 426, the sample 214 is moved outside of the FOV to take an image of the kth pattern.

Next, the process returns to step 422 in which the sample 214 is moved back into FOV, and rotate it back to angle 1. In addition, the pattern is moved out and another image is captured with sample only; this image is referred to as $\text{prop}^{k=2}$. Now we move on to next pattern k=2, lock the pattern, and continue to rotate and image to n=1, 2, . . . . N and take images.

The loop is repeated until all images are taken for the last pattern k=K.

In step 428, the thermal and mechanical sample drifts are estimated by the computer system 224. All images are aligned together, i.e., starting with aligning all the propagation phase images $\text{prop}^{1,n=1}$, $\text{prop}^{2,n=1}$, . . . $\text{prop}^{K,n=1}$, as all these images are supposed to be the same.

It is assumed the sample 214 is fully inside the FOV, therefore, the intensity in the corner (where only air is imaged) is used to normalize the intensity of the images taken nearby (in time). This addresses any flicker in the source power. It is very likely the next image taken after $\text{prop}^{k,n=1}$, $\text{proj}^{k,n=1}$, is at exactly the same place, since the sample has not been moved. Hence, it is reasonable to assume those two images are aligned, and the rest projections $\text{proj}^{k,n=2}$, $\text{proj}^{k,n=3}$, etc are registered with this $\text{proj}^{k,n=1}$, using the patterned structure outside sample region.

In step 430, all the sample only images are registered by the computer system 224. The displacement information is used to register images taken with different patterns.

Once all the images are aligned, all the K images for viewing the sample at angle n are processed in step 432 by the computer system 224. The phase and darkfield signal are extracted at angle n.

Then, this is done for all the n=1, 2, . . . . N, images. The phase and darkfield tomography is reconstructed from those n darkfield and phase images in step 434 by the computer system 224.

FIGS. 5A-5G shows different images and the statistics of those images of a sample is made with a PMMA sphere glued to a carbon fiber.

Figure 5A:
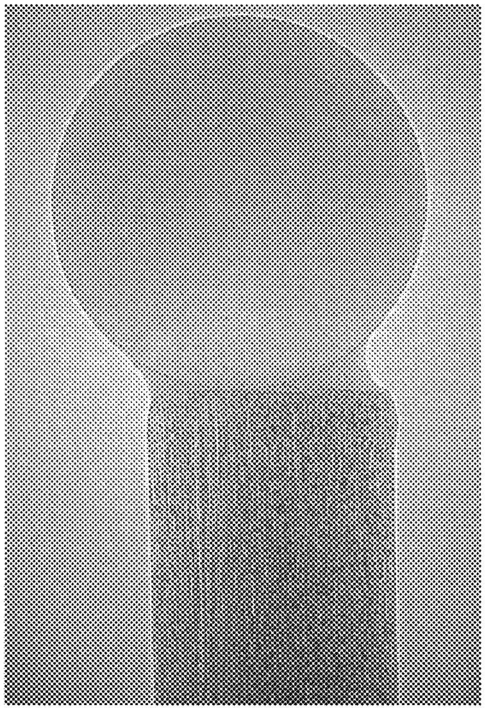
FIG. 5A is a contrast image of the sample (PMMA sphere glued to a carbon fiber stick)
Figure 5B:
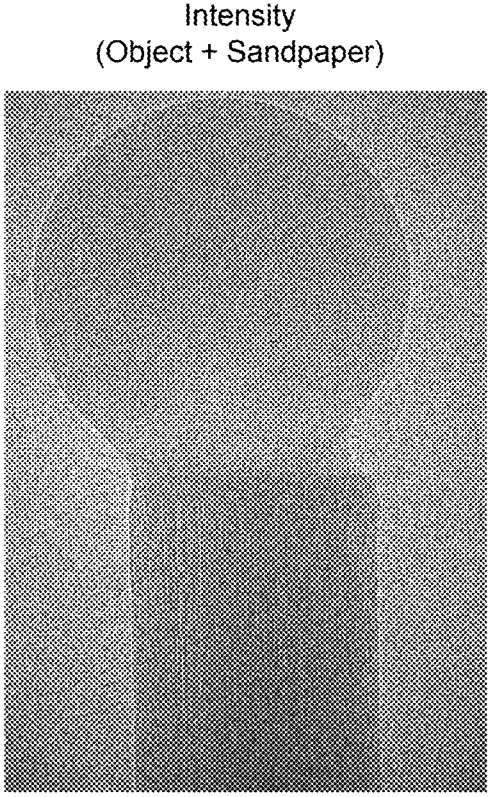
FIG. 5B is a contrast image with a spatial beam modulator in the imaging path showing speckle patterns.

FIG. 5A is a contrast image of the sample; and FIG. 5B is a contrast image with the spatial beam modulator (SiC sandpaper) in the imaging path.

Figure 5C:
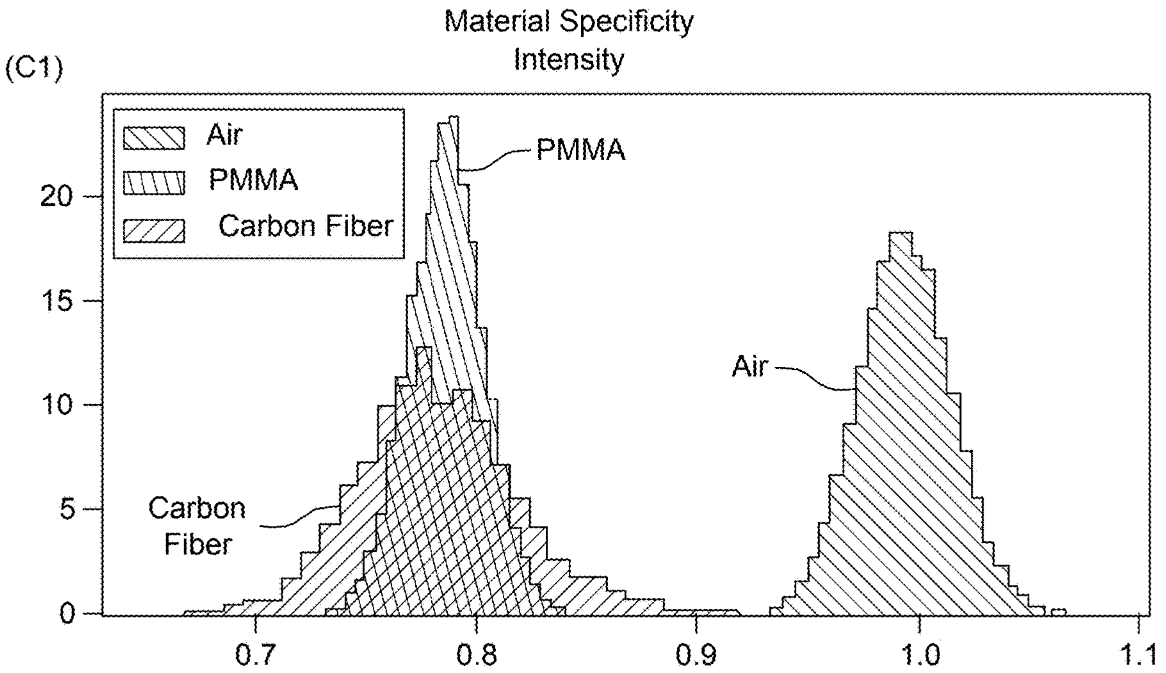
FIG. 5C shows histogram plots of the values of three types of signals: absorption (plot C1) and phase and dark-field (plot C2) for the three materials associated with the images (air, PMMA, and carbon fiber)
Figure 5C:
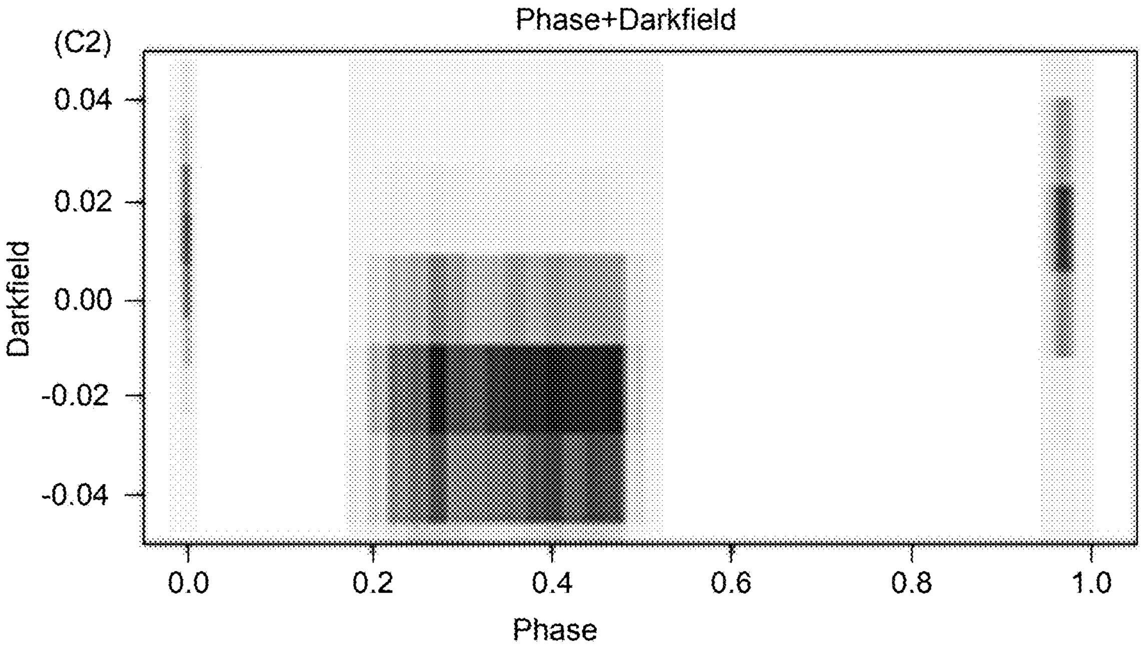

FIG. 5C shows histogram plots of the values of three types of signals: absorption (plot C1) and phase and darkfield (plot C2) for the three materials associated with the images (air, PMMA, and carbon fiber).

Figure 5D:
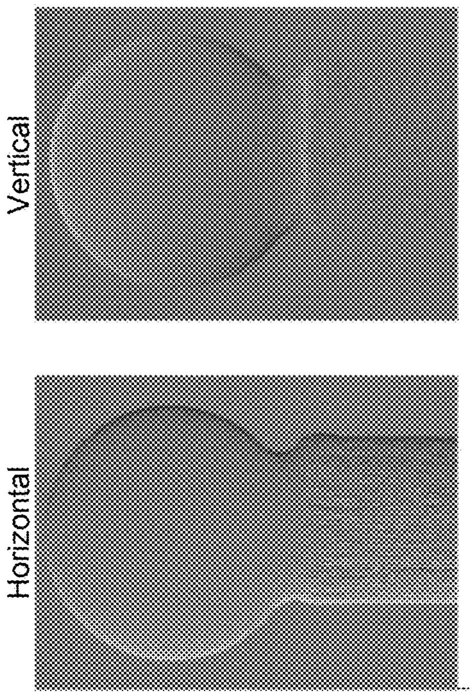
FIG. 5D shows two images of the sample showing the directional darkfield signal alone in both horizontal and vertical axes.

FIG. 5D shows two images of the sample showing the directional darkfield signal alone in both horizontal and vertical axes.

Figure 5E:
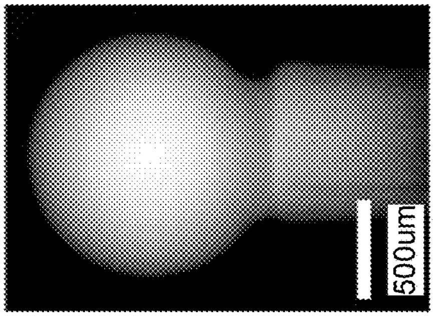
FIG. 5E shows a clean phase integral from the phase gradients.

FIG. 5E shows a clean phase integral from the phase gradients (also called differential phase contrast in literature, e.g., in Pfeiffer 2006) displayed in FIG. 5D. From the images, we can see the surface structure of the PMMA sphere. The phase integration is achieved by a Fourier method (Frankot, Robert T., and Rama Chellappa. "A method for enforcing integrability in shape from shading algorithms." IEEE Transactions on pattern analysis and machine intelligence 10.4 (1988): 439-451 (Frankot 1988)), where a homogeneous Dirichlet boundary condition is used. However, other phase integration methods can also be used, such as the Horn and Brooks method (Horn, Berthold K P, and Michael J. Brooks. "The variational approach to shape from shading." Computer Vision, Graphics, and Image Processing 33.2 (1986): 174-208 (Horn 1986)).

Figure 5F:
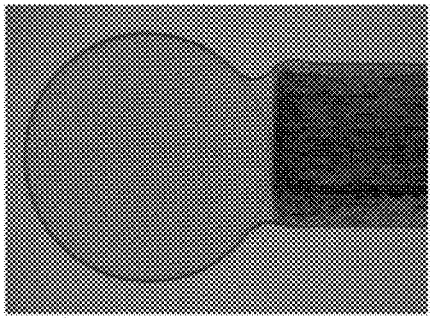
FIGS. 5F and 5G show the estimated dark field and transmission signals.
Figure 5G:
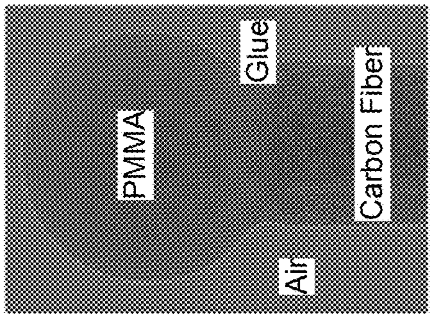

With the registered speckle patches, the dark field and transmission signal can be estimated as shown in FIGS. 5F and 5G. Assuming N patterns are used, at each spatial position on the images, we have N values for the reference, denoted as $x \in \mathbb{R}^N$, and N values for the sample, $y \in \mathbb{R}^N$.

There are ways to estimate the dark field and transmission (Zdora 2018). The first one is contrast-based. The intuition behind it is that the impact of many sub-resolution features refracting the X-rays through regions of high lateral phase gradient will sum to an effective blur of local features (USAXS). Hence, the contrast of speckles gives a qualitative estimation of how strong the USAXS's are, and the USAXS v and transmission signal T can be computed as:

$$T = \frac{\mathbb{E}(y)}{\mathbb{E}(x)}$$

And $$v = \frac{std(y)}{std(x) * T}$$

$\mathbb{E}$ (.) computes the mean, and std(.) computes the standard deviation. Again, to leverage highly optimized operations in modern deep learning libraries, instead of computing the standard deviation directly, we use the equation $\mathbb{E}((x-\mathbb{E}(x))^2)=\mathbb{E}(x^2)-\mathbb{E}(x)^2$, which translates the calculation of std(.) of patches to a series of $\mathbb{E}$ (.) operations on patches that can be implemented efficiently. Besides the contrast-based method, the second, more quantitative method, is based on a physics model (Zdora2018). We denote $\alpha \in \mathbb{R}^N$ as the spatially average (with a predefined sized window) of the reference image around the pixel x. The sample and reference image's pixel values are related with $$y = \beta\alpha + \kappa x,$$

Where $\beta = T(1-v)$, $k = Tv$. Again v is the USAXS signal, and T is transmission signal. This can be written into a matrix vector multiplication $$[\alpha, x]\begin{bmatrix}\beta \\ \kappa\end{bmatrix} = y$$

If we denote matrix $W=[\alpha, x] \in \mathbb{R}^{N \times 2}$, $\beta$ and $\kappa$ can be easily computed as $$\begin{bmatrix}\beta \\ \kappa\end{bmatrix} = (W^T W)^{-1} W^T y$$

Note that we have different W for each individual pixels, but again this can be very efficiently implemented in modern deep learning libraries, which is highly optimized for computing matrix multiplications in parallel.

FIG. 5F shows a measurement and derived signal for a sample made with a PMMA sphere glued onto a carbon fiber. Darkfield image is extracted by the more quantitative model-based method. The combination of darkfield and phase signal gives more specificity in terms of separating air, PMMA, and carbon fiber.

Directional Darkfield Imaging

As mentioned above, phenomenon-wise, the USAXS blurs out the image, and causes the intensity of corresponding pixel to decay. By modelling this blur as a Gaussian blur, and estimating the anisotropic covariance of this Gaussian, one embodiment of the invention can derive the directional darkfield signal alone in both horizontal and vertical axes. By computing the angle between vertical and horizontal signal for each pixel, an orientation map can be generated (Smith, Ronan, et al. "X-ray directional dark-field imaging using Unified Modulated Pattern Analysis." Plos one 17.8 (2022): e0273315 (Smith2022)).

Note that similar to the Beer-Lambert law that is widely used in modelling the absorption projection, which says the log of intensity decay can be approximated as linear sum of the attenuation, the definition of phase is also a linear sum of the refractive index change along the path (see Eq. 1). Therefore, standard reconstruction algorithm for parallel (Zdora, Marie-Christine, et al. "X-ray phase tomography with near-field speckles for three-dimensional virtual histology." Optica 7.9 (2020): 1221-1227 (Zdora 2020)) and cone beam (Hagen, C. K., et al. "Low-dose phase contrast tomography with conventional X-rayX-ray sources." Medical Physics Letter 41.7 (2014): 070701-1-070701-5 (Hagen 2014)) CT can be used. Moreover, darkfield tomography can also be achieved (Doherty, Adam, et al., "Edge-Illumination X-Ray Dark-Field Tomography." American Physical Society 19 (2023): 054042-1-054042-8 (Doherty 2023)). Similar to the attenuation signal, the darkfield signal is modelled as the multiplication of all the darkfield perturbation along the path (Doherty2023), (Bech, M., et al., "Quantitative XX-ray dark-field computed tomography." Phys. Med. Biol. 55 (2010): 5529-5539)), therefore, the log of the total signal can also be written as the sum of all the contributing signal along the path.

Applications

As demonstrated by FIGS. 5A-5G, and also in general, the phase signal gives better contrast for low-atomic-number materials. Combined with darkfield signal, this technique gives better specificity for identifying material. As shown in FIG. 5C, while carbon fiber and PMMA cannot be distinguished very well with absorption signal alone, they can be well separated by the phase and darkfield signals.

The invention can be used for high resolution inspection of soft tissue, such as micro-model organisms (e.g., zebrafish, fruitfly), and organs of small-model animals (e.g., kidney of mouse). In addition, examination of small defects in parts made with composite materials (e.g. for additive manufacturing. i.e., nylon/carbon fiber/polymer resin 3d printing) is also a nature application.

While this invention has been particularly shown and described with references to preferred embodiments thereof, it will be understood by those skilled in the art that various changes in form and details may be made therein without departing from the scope of the invention encompassed by the appended claims.

What is claimed is:

1. An X-ray microscopy system for phase contrast and dark-field imaging, comprising:
a laboratory X-ray source configured to emit an at least a partially coherent X-ray beam;
a spatial beam modulator positioned in the path of the X-ray beam;
a sample stage configured to hold and position the sample within the X-ray beam before or after the spatial beam modulator;
an X-ray detection system positioned to receive the X-ray beam additionally modulated by the sample to detect a speckle pattern generated by the spatial beam modulator, the X-ray detection system comprising:
a spatially resolved detector with a pixel size sufficient to capture shifts in the speckle pattern caused by refraction of the X-ray while traveling through the spatial beam modulator and through the sample;
wherein the system is configured such that the source-to-detector distance is less than 100 centimeters.

2. The X-ray microscopy system of claim 1, wherein the X-ray detection system further comprises a scintillator configured to convert X-rays into light and an optical system configured to collect and focus the light from the scintillator onto the spatially resolved detector.

3. The X-ray microscopy system of claim 1, wherein the laboratory X-ray source is a laboratory X-ray source with a focal spot size of less than 5 micrometers.

4. The X-ray microscopy system of claim 1, wherein the laboratory X-ray source is a laboratory X-ray source with a focal spot size of less than 3 micrometers.

5. The X-ray microscopy system of claim 1, wherein the spatial beam modulator is a random phase object.

6. The X-ray microscopy system of claim 1, wherein the spatial beam modulator comprises a piece of silicon carbide (SiC) sandpaper.

7. The X-ray microscopy system of claim 1, wherein the spatial beam modulator comprises a grating.

8. The X-ray microscopy system of claim 1, wherein the spatially resolved detector has an effective pixel size less than 5 micrometers.

9. The X-ray microscopy system of claim 8, wherein the effective pixel size is less than 300 nanometers.

10. The X-ray microscopy system of claim 1, wherein the scintillator is thin to provide high resolution to low-energy X-rays.

11. The X-ray microscopy system of claim 1, wherein the laboratory X-ray source is configured to generate X-rays with energies less than 50 keV.

12. The X-ray microscopy system of claim 11, wherein the X-ray energies are less than 20 keV.

13. A method for simultaneous X-ray phase contrast and dark-field imaging of a sample, comprising:
generating an at least partially coherent X-ray beam using a laboratory X-ray source;
passing the X-ray beam through a spatial beam modulator to generate a speckle pattern in a field of view (FOV);
positioning a sample in the beam, before or after the spatial beam modulator;
detecting the X-ray beam after it has passed through the sample using an X-ray detection system comprising a spatially resolved detector with a pixel size sufficient to capture shifts and contrast degradation in the speckle pattern;
obtaining a reference speckle image without the sample and a sample speckle image with the sample in the FOV;
registering the reference and sample speckle images;
tracking shifts in the speckle patterns between the reference and sample images to determine phase gradients; and
integrating the phase gradients to produce a phase image of the sample and contrast changes of the speckle patterns to determine a darkfield signal;
wherein a source-detector distance is less than 100 centimeters (cm).

14. The method of claim 13, further comprising repeating the steps of obtaining speckle images while rotating and/or translating the sample, and reconstructing a three-dimensional tomographic image of the sample.

15. The method of claim 13, wherein tracking shifts in the speckle patterns comprises using a correlation-based method or a distance-based method.

16. The method of claim 13, wherein integrating the phase gradients comprises using Fourier methods or variational methods to compute the integrated phase.

* * * * *